(12) United States Patent  (10) Patent No.: US 6,508,462 B2
Eshelman  (45) Date of Patent: Jan. 21, 2003

(54) INDEPENDENT SUSPENSION BUSHING BLOCK

(75) Inventor: Edward J. Eshelman, Rochester Hills, MI (US)

(73) Assignee: Meritor Heavy Vehicle Technology, L.L.C., Troy, MI (US)

( * ) Notice: Subject to any disclaimer, the term of this patent is extended or adjusted under 35 U.S.C. 154(b) by 26 days.

(21) Appl. No.: 09/738,681

(22) Filed: Dec. 15, 2000

(65) Prior Publication Data

US 2002/0074760 A1 Jun. 20, 2002

(51) Int. Cl.⁷ .............................................. B60G 13/00
(52) U.S. Cl. .............. 267/220; 280/124.1; 280/124.153
(58) Field of Search .......................... 267/34, 276, 223, 267/188, 189, 220; 280/124.1, 124.109, 124.128, 124.129, 124.13, 124.131, 124.132, 124.134, 124.153, 124.147, 124.155; 188/321.11

(56) References Cited

U.S. PATENT DOCUMENTS 3,727,385 A  * 4/1973  Twidale et al. ............... 56/208
4,955,144 A  * 9/1990  Lienard et al. .............. 105/4.2

* cited by examiner

*Primary Examiner*—Pam Rodriguez
(74) *Attorney, Agent, or Firm*—Carlson Gaskey & Olds

(57) ABSTRACT

A bushing block for use with a trunnion assembly of an independent suspension integrates a bearing cap and a bushing into a single component. A face seal is installed on a trunnion pin of the trunnion assembly. The bushing block is next assembled on the trunnion pin, the bushing block contacting the face seal. The trunnion assembly is installed on a lower control arm assembly, a pair of cap screw apertures on the bushing block aligning with a pair of cap screw apertures on the lower control arm assembly. Cap screws are installed therein. Grease grooves are formed on the interior surface of the bushing block to allow grease to flow down the exterior surface of the trunnion pin, eliminating additional machining on the trunnion pin.

17 Claims, 3 Drawing Sheets

INDEPENDENT SUSPENSION BUSHING BLOCK

BACKGROUND OF THE INVENTION

The present invention relates generally to a bushing block which combines the bushing and bearing cap components of a trunnion assembly of an independent suspension.

In an independent suspension, a trunnion assembly is employed to connect the suspension spring and shock absorber assembly to the lower control arm assembly. Each trunnion assembly includes a pair of trunnion pins, and a bushing installed over each trunnion pin. A bearing cap secures the trunnion pin and the bushing to the lower control arm assembly by a pair of cap screws.

The trunnion pin is greased by adding lubricant to a grease fitting located on the upper portion of the bushing. In prior trunnion assemblies, grease grooves are machined on the exterior surface of the trunnion pin to allow grease to flow over the trunnion pin.

There are several drawbacks to employing the prior art trunnion assembly. For one, as the bushing and bearing cap are separate components, numerous parts and steps are required for assembly. Additionally, the grease grooves are machined into the exterior surface of the trunnion pin, requiring an additional machining step. Finally, a face seal utilized on the trunnion assembly acts as an axial bearing surface.

Hence, there is a need in the art for a bushing block which combines the bushing and bearing cap components of a trunnion assembly of an independent suspension.

SUMMARY OF THE INVENTION

The present invention relates generally to a bushing block which combines the bushing and bearing cap components of a trunnion assembly of an independent suspension.

A bushing block of the present invention integrates a bushing and a bearing cap into a single component. Preferably, the block is formed of powdered metal. A grease fitting aperture is formed into the upper portion of the bushing block and a grease fitting is installed therein. A pair of cap screw apertures are drilled in the side arms of the bushing block. An annular face seal is pressed onto the trunnion pin, and the bushing block is then mounted on the trunnion pin, with the bushing block contacting the face seal.

The trunnion assembly is positioned on the lower control arm assembly such that the cap screw apertures of the bushing block substantially align with cap screw apertures drilled into the lower control arm assembly. Cap screws are inserted in the apertures, securing the bushing block to the lower control arm assembly.

By employing a bushing block, a more compact design is possible. Additionally, the bushing blocks provides both axial and radial constraint for the trunnion pin.

A further feature of the invention allows for grease grooves formed on the interior surface of the bushing block. The grooves allow grease to flow down the exterior surface of the trunnion pin to grease the assembly.

Accordingly, the present invention provides a bushing block which combines the bushing and bearing cap components of a trunnion assembly of an independent suspension.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
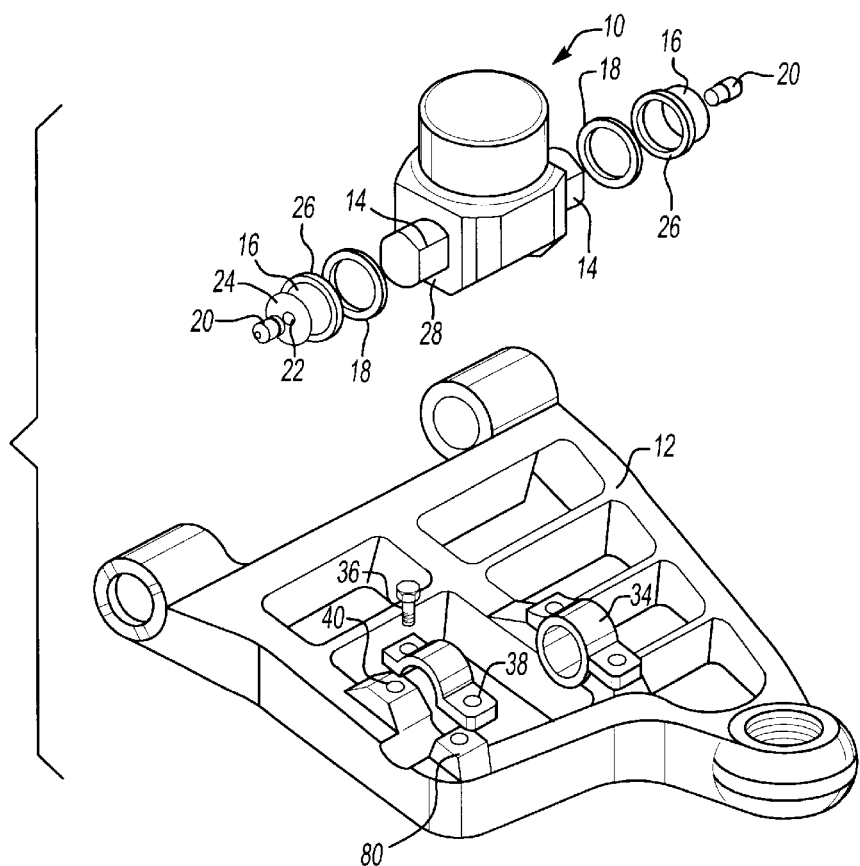
FIG. 1A illustrates an exploded view of a prior art trunnion assembly employed on a lower control arm assembly of an independent suspension.
Figure 1B:
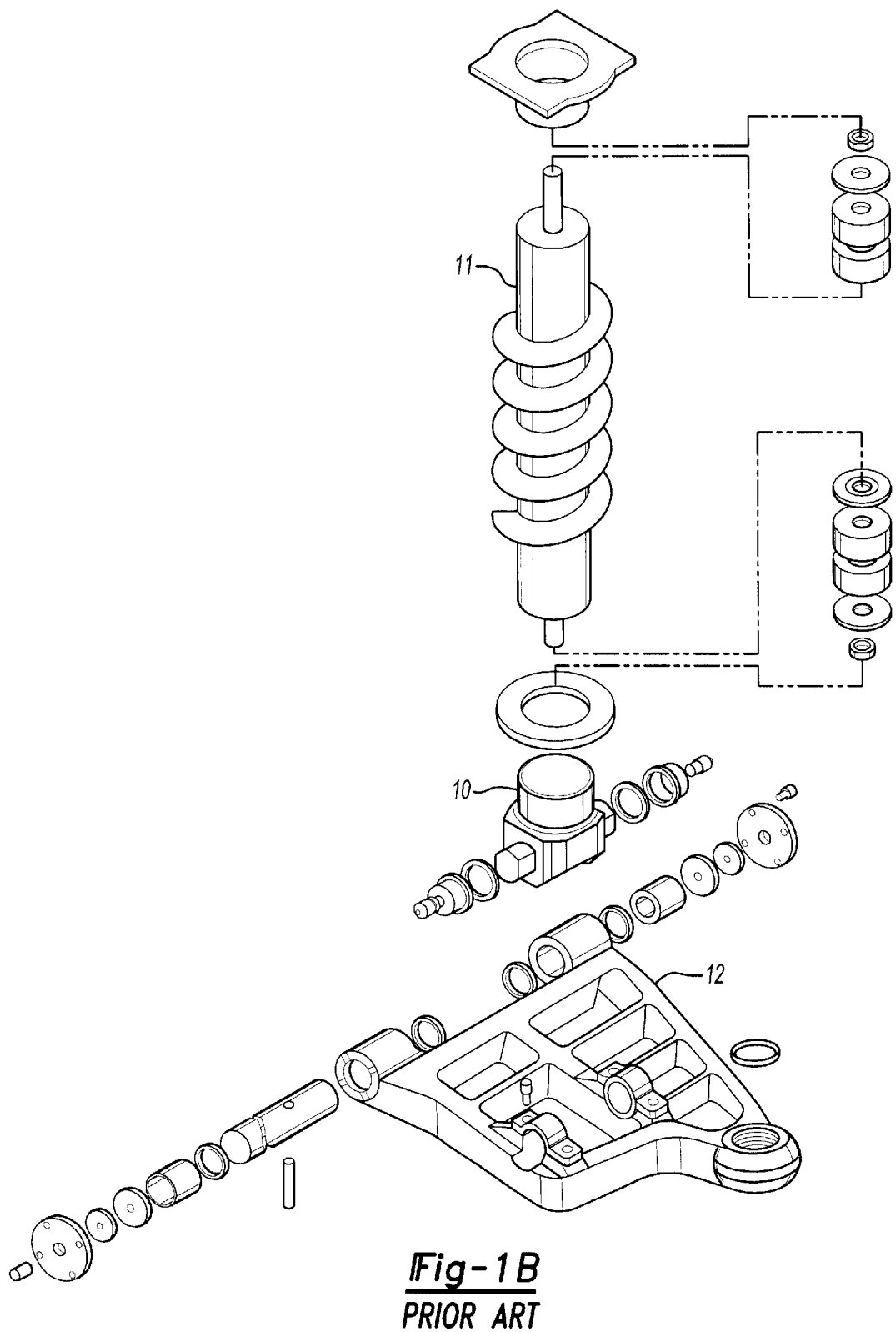
FIG. 1B illustrates an exploded view of a prior art independent suspension.

Referring now to the drawings, FIG. 1A illustrates an exploded view of a prior art trunnion assembly 10 employed on a lower control arm assembly 12 of an independent suspension. As shown in FIG. 1B, the trunnion assembly 10 is employed on a spring and shock absorber assembly 11 of an independent suspension system. The prior art trunnion assembly 10 includes a pair of trunnion pins 14 positioned on opposite sides of the trunnion assembly 10. A bushing 16 is assembled over each trunnion pin 14 with a face seal 18 assembled on the collar 26 of the bushing 16. A grease fitting 20 is installed in a grease fitting aperture 22 on the upper portion 24 of the bushing 16.

Figure 2:
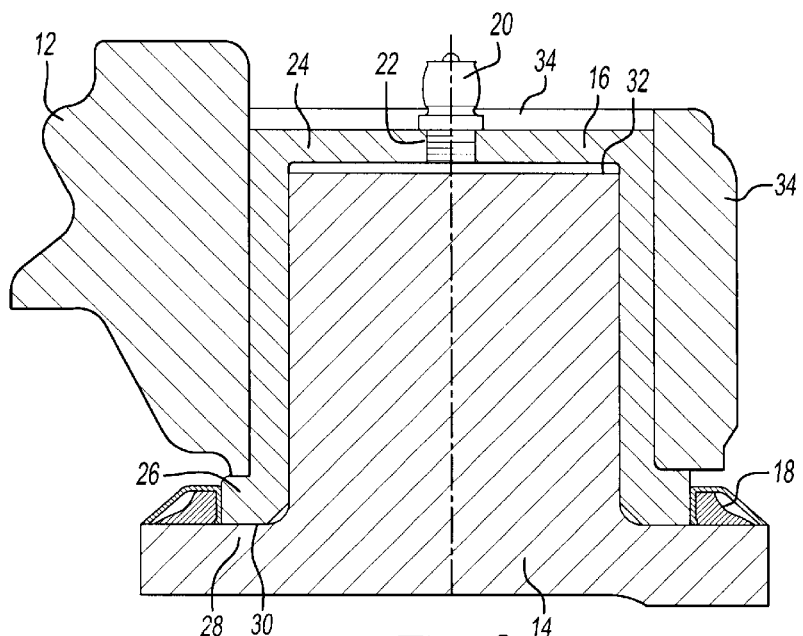
FIG. 2 illustrates a cross sectional side view of a trunnion pin employing a separate bushing and a bearing cap of the prior art.

As shown in FIG. 2, the bushing 16 with the installed face seal 18 is assembled on a trunnion pin 14. The collar 26 of the bushing 16 contacts the trunnion side arms 28 at the mating surface 30. A space 32 exists between the trunnion pin 14 and the bushing 16. The face seal 18 prevents contaminants from damaging the bearing surfaces. The trunnion assembly 10 is then installed on the lower control arm assembly 12. A bearing cap 34 positioned over the bushing 16 secures the bushing 16 to the lower control arm assembly 12 by a pair of cap screws 36 inserted into a pair of bearing cap apertures 38 aligned with a pair of lower control arm apertures 40.

Figure 3:
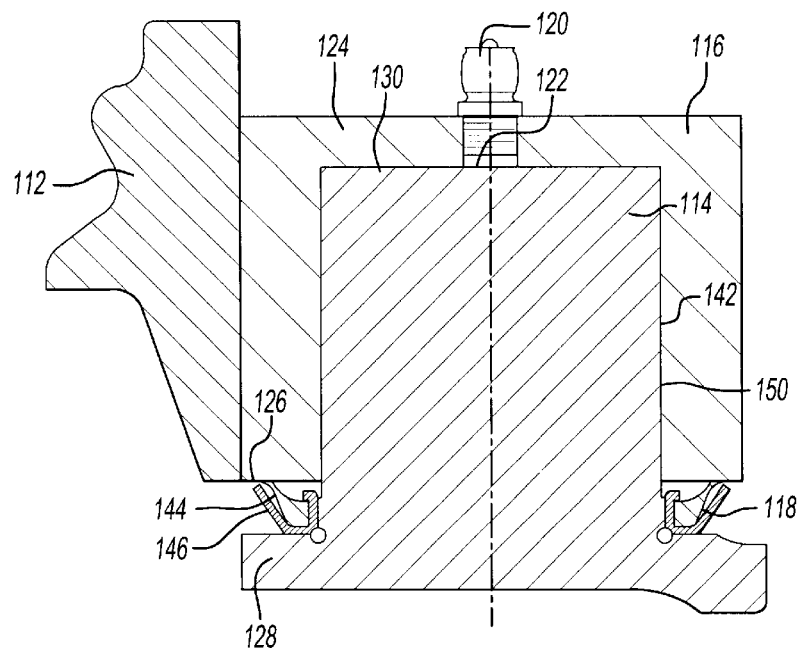
FIG. 3 illustrates a cross sectional side view of a trunnion pin employing a bushing block of the present invention.

The bushing block 116 of the present invention is illustrated in FIG. 3. Powdered metal is preferably used to form a bushing block 116 which integrates the bearing cap 34 and bushing 16 components of the prior art into a single component.

Figure 4:
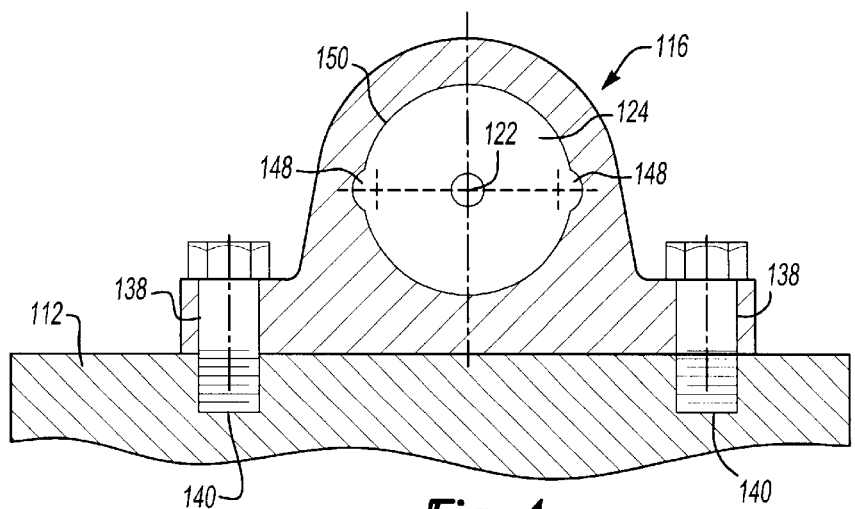
FIG. 4 illustrates a cross sectional side view of the bushing block of the present invention employing grease grooves.
Figure 5:
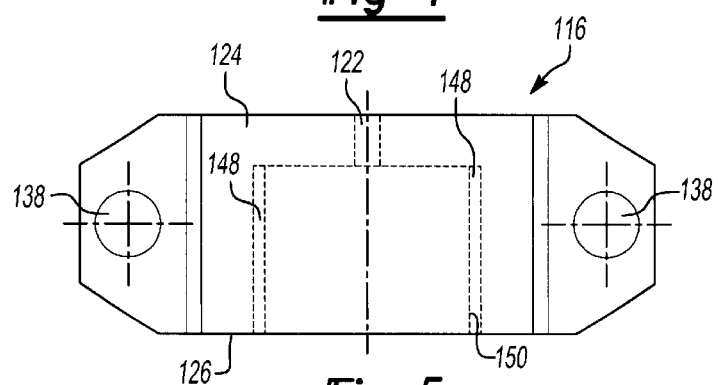
FIG. 5 illustrates a top view of the bushing block of the present invention employing grease grooves.

After the bushing block 116 is formed, a pair of cap screw apertures 138 (as shown in FIGS. 4 and 5) and a grease fitting aperture 122 are drilled into the bushing block 116. A grease fitting 120 in installed on the upper portion 124 of the bushing block 116.

An annular face seal 118 is pressed onto the trunnion pin 114 so that the face seal 118 substantially contacts the trunnion block 128 of the trunnion assembly. The face seal 118 includes a rubber portion 144 and a stamped steel outer portion 146.

The bushing block 116 is mounted on the trunnion pin 114, the lower surface 126 of the bushing block 116 substantially contacting the face scald 118. The trunnion assembly is installed on the lower control arm assemble 112. Cap screw apertures 138 drilled into the bushing block 116 are substantially aligned with cap screw apertures 140 drilled into the lower control arm assembly 112. Cap screws arc installed into the aligned cap screw apertures 138, 140 to secure the bushing block 116 to the lower control arm assembly 112.

The trunnion pin 114 and the bushing block 116 substantially contact at the mating surface 130. Because the trunnion pin 114 substantially contacts the upper portion 124 of the bushing block 116, the space 32 of the prior art is eliminated and a more compact design is possible.

Additionally, due to this contact, the bushing block 116 provides both axial and radial constraint of the trunnion pin 114 without a collar portion. Resistance to contamination is provided by the face seal 118. Axial constraint is provided by upper portion 124 of the bushing block 116 which substantially contacts the trunnion pin 114 at the mating surface 130.

By employing a powdered metal technique, features can be formed in the bushing block 116 without machining. As shown in FIGS. 4 and 5, grease grooves 148 are formed on the interior surface 150 of the bushing block 116, eliminating machining of grease grooves on the trunnion pin 114. When it is necessary to grease the trunnion assembly, lubrication is applied to the grease fitting 120. The grease flows down the grease grooves 148 and along the exterior surface 142 of the trunnion pin 114, eventually reaching the face seal 118. Although a pair of grease grooves 148 is illustrated in FIGS. 4 and 5, it is to be understood that any number of grease grooves 148 can be employed.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An independent suspension including a trunnion assembly comprising:
   a trunnion block having a pair of trunnion pins and mounting a suspension component;
   a pair of bushing blocks each having a bushing portion with an interior surface defining an opening sized to house said pair of trunnion pins, said opening extending from an upper cover to a lower surface and having a central axis, and a pair of bushing arms integrated with said bushing portion and attached to opposite sides of said bushing portion, each said bushing arm having a bushing aperture.

2. The independent suspension as recited in claim 1 further comprising an annular seal press fit on each said trunnion pin, said seal positioned between said lower surface of said bushing block and said trunnion block.

3. The independent suspension as recited in claim 1 wherein each said bushing aperture is substantially perpendicular to said central axis.

4. The independent suspension as recited in claim 1 wherein each said bushing aperture is substantially aligned with a lower control arm aperture of a lower control arm assembly and an attachment member is positioned therein.

5. The independent suspension as recited in claim 4 wherein said attachment member is a pair of capscrews.

6. The independent suspension as recited in claim 1 wherein said bushing block is formed of powdered metal.

7. The independent suspension as recited in claim 1 wherein said upper cover includes a grease fitting aperture located substantially in the center of said upper cover, a grease fitting positioned therein.

8. The independent suspension as recited in claim 1 wherein said bushing block further comprises at least one groove formed on said interior surface of said bushing block, said at least one groove extending from said upper cover to said lower surface.

9. An independent suspension including a trunnion assembly comprising:
   a trunnion block having a pair of trunnion pins and mounting a suspension component;
   a pair of bushing blocks each having a bushing portion with an interior surface defining an opening sized to house said pair of trunnion pins, said opening extending from an upper cover to a lower surface and having a central axis, and a pair of bushing arms attached to opposite sides of said bushing portion, each said bushing arm having a bushing aperture, and said trunnion pin substantially contacts said upper cover of said bushing block.

10. A suspension comprising:
    a lower control arm assembly having a lower control arm aperture;
    a trunnion assembly including a trunnion block having a pair of trunnion pins, a pair of bushing blocks each having a bushing portion with an interior surface defining an opening sized to house said pair of trunnion pins, said opening extending from an upper cover to a lower surface and having a central axis and a pair of bushing arms integrated with said bushing portion and attached to opposite sides of said bushing portion, each said bushing arm having a bushing aperture, and an annular seal press fit on each said trunnion pin, said seal positioned between said lower surface of said bushing block and said trunnion block; and
    a spring and shock absorber mounted on said trunnion assembly.

11. The suspension as recited in claim 10 wherein each said bushing aperture is substantially perpendicular to said central axis.

12. The vehicle as recited in claim 10 wherein each said bushing aperture is substantially aligned with said lower control arm aperture of said lower control arm assembly and an attachment member is positioned therein.

13. The vehicle as recited in claim 12 wherein said attachment remember is a capscrew.

14. The vehicle as recited in claim 10 wherein said bushing block is formed of powdered metal.

15. The vehicle as recited in claim 10 wherein said upper cover includes a grease fitting aperture located substantially in the center of said upper cover, a grease fitting positioned therein.

16. The vehicle as recited in claim 10 wherein said bushing block further comprises at least one groove formed on said interior surface of said bushing block, said at least one groove extending from said upper cover to said lower surface.

17. A suspension comprising:

a lower control arm assembly having a lower control arm aperture;

a trunnion assembly including a trunnion block having a pair of trunnion pins, a pair of bushing blocks each having a bushing portion with an interior surface defining an opening sized to house said pair of trunnion pins, said opening extending from an upper cover to a lower surface and having a central axis and a pair of bushing arms attached to opposite sides of said bushing portion, each said bushing arm having a bushing aperture, and an annular seal press fit on each said trunnion pin, said seal positioned between said lower surface of said bushing block and said trunnion block; and a spring and shock absorber mounted on said trunnion assembly, and said trunnion pin substantially contacts said upper cover of said bushing block.

* * * * *

UNITED STATES PATENT AND TRADEMARK OFFICE
CERTIFICATE OF CORRECTION

PATENT NO.    : 6,508,462 B2
DATED         : January 21, 2003
INVENTOR(S)   : Edward J. Eshelman It is certified that error appears in the above-identified patent and that said Letters Patent is hereby corrected as shown below:

<u>Title page,</u>
Item [*] Notice: should read
-- Subject to any disclaimer, the term of this patent is extended or adjusted under 35 U.S.C. 154(b) by 0 days. --

Signed and Sealed this

First Day of July, 2003

JAMES E. ROGAN
*Director of the United States Patent and Trademark Office*